Dec. 6, 1932.  J. RUMPEL  1,890,414
AUTOMATIC METER LID OPERATED WIPER
Filed Jan. 8, 1932
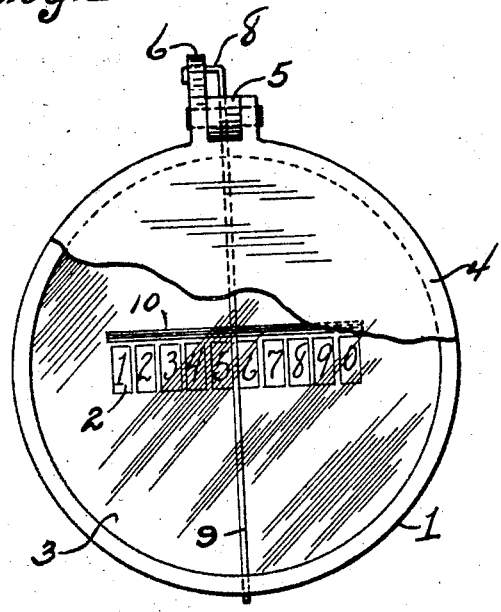
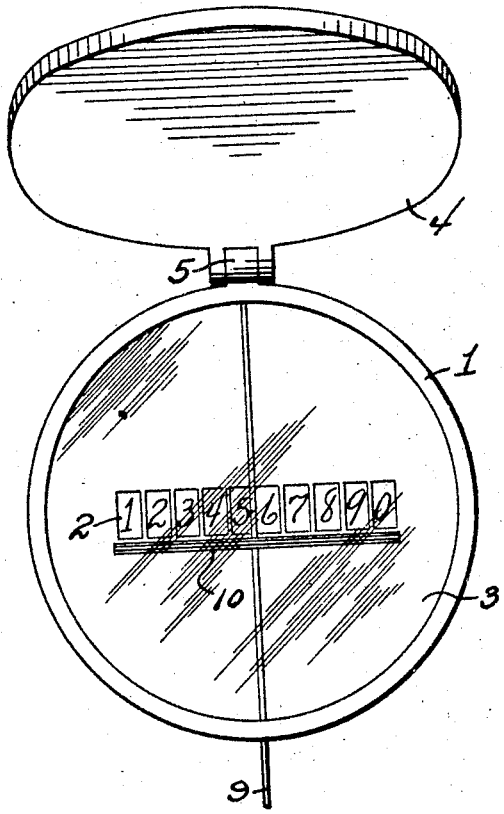
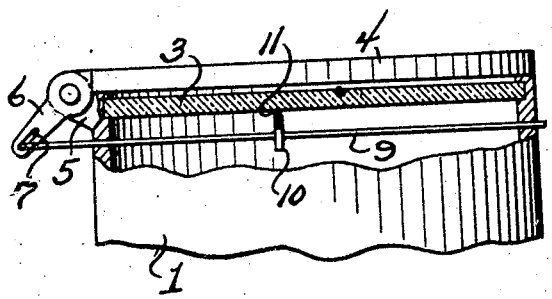
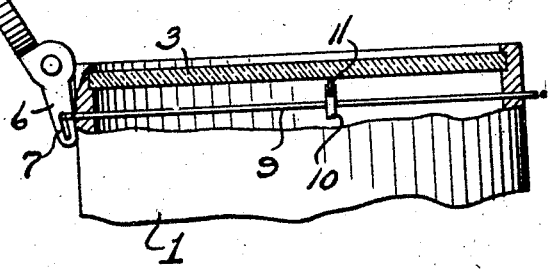
Joseph Rumpel
INVENTOR
BY Victor J. Evans & Co.
ATTORNEY Patented Dec. 6, 1932

1,890,414

UNITED STATES PATENT OFFICE

JOSEPH RUMPEL, OF NAMPA, IDAHO

AUTOMATIC METER-LID OPERATED WIPER

Application filed January 8, 1932. Serial No. 585,584.

The object of this, my present invention, is the provision of means for automatically wiping the glass face of a water, gas or other meters, which glass face or cover is rendered practically non-transparent by the accumulation of vapor thereon which renders the reading of the meter difficult.

A further object is the provision of a wiper for the glass face of meters which is automatically operated upon the opening of the cover for such meters.

A further object is the provision of a device for this purpose which is of an extremely simple construction, may be readily attached to any ordinary construction of meters and which is reliable and efficient in practical use.

To the attainment of the foregoing the invention consists in the improvement hereinafter described and definitely claimed.

In the drawing:

Figure 1 is a top plan view of the meter, a portion of the cover plate being broken away.

Figure 2 is a sectional view of Figure 1.

Figure 3 is a plan view showing the cover for the meter in open position.

Figure 4 is an approximately sectional view through the device as disclosed by Figure 3.

The casing of the meter is indicated by the numeral 1 and the casing contains therein suitable mechanism for operating the numbered disc recording wheels 2 which are arranged a suitable distance below the glass face 3 of the meter. The outer face of the meter is protected by a closure disc 4 which has spaced lugs projecting from the periphery thereof to be received between and to be pivoted to a lug 5 formed with the meter casing 1. One of the lugs on the cover 4 is formed with an extension in the nature of a finger 6 and the said finger is provided with an elongated slot 7. In this slot is received the offset and headed end 8 of a rod 9 that is guided through alining openings in the opposite sides of the meter casing 1. On this rod 9 there is preferably adjustably fixed a holder 10 for a squeegee 11 which is in frictional contact with the under face of the glass 3.

The glass face of the meter is protected from dust or the like by the closure or cover 4 when the latter is swung thereover, but the under face of the glass face becomes blurred by the vapors that enter the meter. The result is that the figures on the wheels 2 are extremely hard to read, as the vapor on the glass face 3 impairs the transparency thereof. With my improvement it is merely necessary to open or raise the cover or lid 4 which imparts a longitudinal movement to the rod 9 and a similar movement to the squeegee which effectively wipes the under face of the glass disc 3. In addition to this the finger 6 contacts with one side of the body of the meter and holds the cover or closure 4 in proper open position.

While I have illustrated one satisfactory embodiment of my improved device my features of invention are capable of extended application and I do not wish to be limited to the specific structure herein shown and described.

Having described the invention, I claim:

1. A means for wiping the under face of a glass cover of a meter box, and which meter box is normally closed by a hinged cover, said means comprising a squeegee which is in contact with the under face of the glass case and means connected to the squeegee and operated by the opening and closing of the cover for imparting a longitudinal movement to the squeegee.

2. In a device for the purpose set forth, and in combination with a meter having a glass face and a hinged cover, said cover, at the hinged end thereof, having a depending finger, a rod loosely connected to the finger and guided through the openings in the opposite sides of the meter and a squeegee carried by said rod and in contact with the under face of the glass face.

3. In a device for the purpose set forth, a meter box having a glass face and a hinged cover, said cover having a finger depending from the hinge thereof and which finger is provided with an elongated slot, a rod guided through openings in the opposite sides of the meter and having an offset headed end received through the opening in the finger, a casing on the rod and a squeegee carried by the casing in contact with the under surface of the glass face.

In testimony whereof I affix my signature.

JOSEPH RUMPEL.